Sept. 28, 1937.　　　　G. MUELLER　　　　2,094,462
FAUCET
Filed Feb. 20, 1935

Inventor
GUSTAVE MUELLER

Richey Watts
Attorneys

Patented Sept. 28, 1937

2,094,462

UNITED STATES PATENT OFFICE 2,094,462

FAUCET

Gustave Mueller, Cleveland, Ohio, assignor to Alfred E. Tomlinson, Shaker Heights, Ohio Application February 20, 1935, Serial No. 7,422

4 Claims. (Cl. 251—132)

This invention relates to improvements in faucets and, more particularly, to improvements in the construction of faucets adapted for controlling the flow of fluid under pressure.

Heretofore numerous attempts have been made to design faucets which would not leak and wherein the life of the wearing parts was increased. However, particularly in faucets used to control the fluid flow from hot water lines, considerable difficulty was experienced. The flow of fluid through a faucet is usually controlled by a valve having a fiber, rubber or composition face closing against a metallic seat surrounding a port. The operator, in closing the ordinary valve, often closes the valve too tightly in which event the sealing element of the valve is forced against the seat with such pressure as to cause undue wear upon both the element and the seat. In self-closing valves, the valve closes against the seat so quickly that the valve hammers against the seat. Such hammering is noisy and has a deleterious effect, soon causing leaks in both the water line and valve. The seat against which the washer effects the seal, usually being integral with the faucet body, is not removable, and gradually becomes pitted causing undue wear on the valves, making frequent replacement necessary. The only solution when the seat becomes worn is to replace the entire faucet since it otherwise takes special tools to resurface the same.

The present invention contemplates a faucet construction in which the deficiencies of the prior art faucets have been eliminated and in which when maintenance should become necessary, the valve may be easily disassembled and repaired. In the improved construction, all the movable valve parts including the entire sealing element for the faucet may be quickly removed as a unit and a new unit substituted; the old unit may then be repaired and used again. Removal of the working parts as a unit permits the same to be easily inspected and if found to be worn or defective, easily replaced. The seat being readily accessible upon removal may be reground and made as good as new.

Still other advantages and improvements in the faucet of the invention will become more apparent from reference to the following description which together with the accompanying drawing illustrates an embodiment of the invention.

Figure 1:
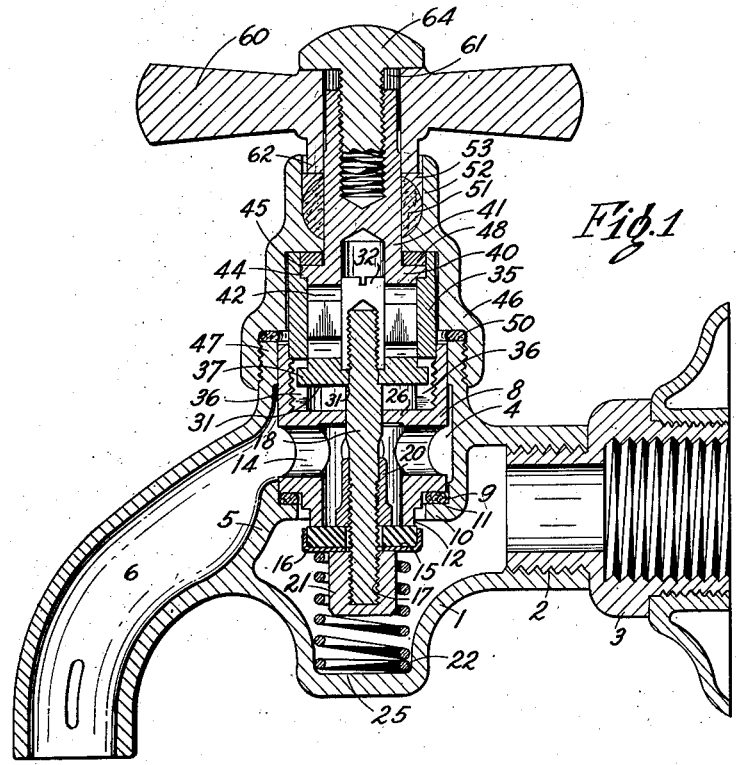
Fig. 1 is a vertical medial section through a faucet embodying the invention.
Figure 2:
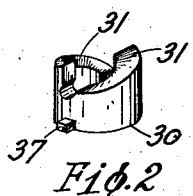
Fig. 2 is a perspective view, on a reduced scale, of one of the valve operating cams.
Figure 4:
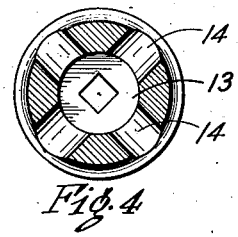
Fig. 4 is a section taken on the line 4—4, Fig. 3.
Figure 5:
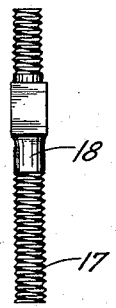
Fig. 5 is an elevational view of the valve spindle.
Figure 6:
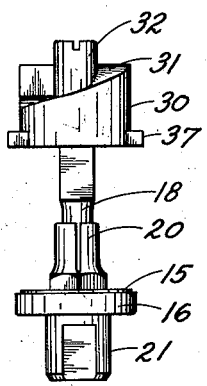
Fig. 6 is an elevational view of the valve and cam assembled on the valve spindle.
Figure 3:
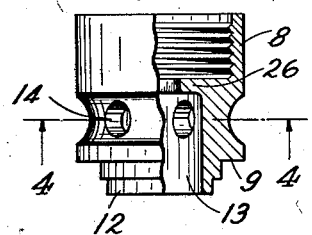
Fig. 3 is an elevational view of a portion of the valve cage with certain parts broken away and shown in section.

Referring now to the drawing throughout which like parts have been illustrated by like reference characters, the faucet of the invention includes a housing adapted to be coupled to a water line or the like. The valve mechanism is supported by a cage which has inlet and outlet ducts and is removable bodily from the housing; fluid flow through the inlet duct is controlled by a spring and cam actuated valve. The upper end of the housing is closed by a bonnet, which also carries an operating handle, and is removable to permit access to, and removal of, the valve mechanism.

As best illustrated in Fig. 1, a hollow body or housing 1 is provided, and has a threaded base 2 adapted for connection by a coupling 3 with a water line. The interior of the housing is formed to provide a substantially cylindrical chamber 4, divided from the lower end by diaphragm 5. A spout 6 provides an outlet from the chamber 4.

The valve assembly is adapted to be seated in the cylindrical chamber 4 and comprises a substantially cylindrical cage or sleeve 8 having an annular shoulder 9 adjacent the lower end adapted to rest upon an annular seat 10 extending around an aperture in the diaphragm 5. A gasket 11 is interposed and furnishes an effective seal between the shoulder and the seat. The lower extremity of the cage extends through the aperture in the diaphragm and terminates in an annular valve seat 12 surrounding an inlet port 13 connected to the interior of the cage. A plurality of outlet ports 14 extending through the wall of the cage on the opposite side of the diaphragm, permits fluid to discharge therethrough into the spout 6.

The inlet port 13 is adapted to be closed by a valve which comprises a centrally apertured washer 15 of rubber or composition in a cup 16 carried by the lower threaded end 17 of a spindle 18. The valve is adapted to be seated on the seat 12 by a spring 22 assisted by the fluid pressure and is adjustable as to position on the spindle, being held on the spindle between a split threaded collar 20 and nut 21. The nut 21 also acts as a guide for the helical closing spring 22 which is disposed about the guide with one end bearing against the lower face of the cup 16 and with the other end seated in a socket 25 formed in the bottom of the housing.

A partition 26 bridges the interior of the cage above the outlet ports and acts as a guide for the spindle 18 which extends therethrough and carries upon its reduced threaded upper end, a substantially cylindrical cam element 30, with its lower face in engagement with a shoulder 31 on the spindle. The cam is held securely on the spindle by a cylindrical threaded guide post 32 which is disposed on the end of the spindle and extends above the cam to form a guide for another cam element, later described. The cam element is provided with a pair of oppositely disposed helical cam faces 31, each of which starts at substantially diametrically opposite points and revolves downward about the post 32 for approximately one-half a revolution. The cam faces are so generated that all radii from the edge of the cam face to the axis of the cam are horizontal. Although the inclination or generation of the cam faces are shown as extending in a right hand direction adapted to a right hand faucet, it is obvious that they might be left handed when a left handed faucet is desirable.

The upper end of the valve cage 8 is threaded interiorly and adapted to receive the threaded skirt of a sleeve 35 which sleeve may be screwed into the cage until the skirt bottoms against the partition 26. The interior of the sleeve provides a smooth running fit with the cylindrical wall of the cam for guiding the same and the lower end of the skirt has a pair of vertical slots or guideways 36 at diametrically opposite points adapted to receive a pair of lugs 37 which extend radially from the lower end of the cam. The sleeve acts as a guide for the cam and spindle, permitting vertical reciprocable movement; rotational movement, however, is prevented by the lugs 37 extending into the slots 36.

The cam member 30, together with the spindle and valve, is adapted to be reciprocated vertically in the sleeve against the spring and water pressure by means of a cam 40 formed integral or otherwise secured to the end of an operating shaft 41 and having cam faces 42 exactly similar to those of the lower cam. As in the lower cam, the faces on the upper cam are helical and revolve downward about the cam or post for substantially one-half a revolution. The upper cam has an axial bore adapted to telescope about and be guided by the post 32. An annular flange 44 is provided on the upper end and is adapted to rotate in a counterbore 45 in the end of the sleeve 35 which provides a guide or bearing therefor.

The valve unit is retained within the housing seated in the chamber by a bonnet 46 which is screwed on the upper threaded end 47 of the housing 1, and is sealed to the threaded end of the housing by a suitable gasket 50. This bonnet has a cylindrical counterbore adapted to be telescoped about the sleeve 35 and the end wall of the bore engages the upper end of the sleeve so that when the bonnet is screwed in the housing it forces the cage securely down upon seat 10 on the diaphragm. The shaft 41 extends through a packing gland in the upper end of the bonnet and a fiber thrust washer 48 is disposed around the stem 41 between the upper surface of the cam and the bonnet.

The packing gland includes a packing 51 disposed in a counterbore 52 about the shaft 41 and is tightened between the shaft and the wall of the counterbore by a ring 53 which is engaged by a skirt 62 on the operating handle. The operating handle 60 is provided with an interiorly fluted hub 61 adapted to be telescoped over and be reciprocable upon the fluted end of the shaft 41. The hub of the handle has an integral depending skirt 62 abutting the ring 53 and when the cap screw 64, which is screwed into a threaded bore in the end of the shaft 41, is tightened, the handle is urged down about the shaft 41, and the skirt 62 contacts the ring 53 forcing the ring down and compressing the packing in the gland.

In operation, rotation of the handle 60 rotates the upper cam 40; the faces of the upper cam being helical and in engagement with the lower cam faces, the lower cam is forced downward together with the valve spindle forcing the valve downward against the fluid and spring pressure off of the seat 12. Water may then pass from the water line past the valve through the inlet port 13 of the cage and out the outlet ports 14 and hence discharge from the spout 6.

When it is desired to close the valve the handle is rotated in the opposite direction and the lower cam is released and the spindle and valve travel upward under the influence of spring and water pressure until the valve rests against the seat 12, sealing the inlet passage 13.

The construction of the cams permits the amount of opening of the valve to be controlled. At the same time the amount of pressure used to close the valve is beyond the control of the operator and undue pressure therefore cannot be exerted by the operator between the valve and seat. The spring and water pressure retain the two cams in contact and hence when the valve is closed, it closes smoothly preventing hammering.

The valve cage, sleeve and valve mechanism including the lower cam are removable as a unit from the housing, as previously stated, it being only necessary to remove the bonnet to obtain access thereto. This permits the repair man to carry in stock the valve cage assembly which may be quickly substituted for the worn assembly, the old assembly may then be returned to the shop for repair after which it may be used again.

Unlike the usual type of cams, the cams in this faucet do not become less effective during wear, the similar nature of the wearing surfaces permitting both cams to wear alike.

Lost motion in the valve may be controlled by adjusting the vertical position of the valve on the spindle.

Although the faucet shown is of the wall mounted type, it is obvious that the same mechanism with slight minor changes in the housing can be adapted to basin mounting. Still other numerous and extensive departures from the invention will be apparent to those versed in the art but without departing from the spirit and scope of the invention.

I claim:

1. In a faucet of the class described, a housing, an inlet adapted for connection to a water line, an outlet adapted for discharge of fluid therefrom, means to control fluid flow from the inlet to the outlet including an apertured diaphragm disposed between the inlet and outlet, a valve cage supported by the diaphragm and extending through the aperture, a valve spindle carried by the cage and a valve on the one end of the spindle extending beyond the cage, the end of the cage formed to provide an inlet port and the medial portion of the cage formed to provide an outlet, said valve adapted to close the inlet, and spring means for closing the valve, a cam on the other end of the valve spindle, a second cam operable by a shaft from without the housing and rotatable to move the first cam and valve spindle against the tension of the spring to open the valve.

2. In a faucet of the class described, a housing, a cylindrical chamber in the housing, a valve cage disposed in said cylindrical chamber and having the end formed to provide a valve seat circumambient an inlet port, a valve operating spindle reciprocable in the cage and having one end extending beyond the confines of the cage and a valve adjustably carried on the end of the spindle adapted to be seated on said seat, a spring interposed between the valve and the bottom of the housing for closing the valve, a reciprocable cam member in the cage carried by the spindle and having a pair of cam faces, a rotatable cam provided with a pair of cam faces matched to the faces of the first cam, an operating shaft for supporting the second cam and a bonnet for attachment to the housing and supporting the operating stem, a packing gland in the bonnet providing a rotational seal for the operating stem, an operating handle for rotating the stem telescoped over the end of the stem and provided with a skirt adapted to tighten the packing gland by longitudinal adjustment of the handle on said stem.

3. In a faucet of the class described, a housing, a cylindrical chamber in the housing, a valve cage disposed in said cylindrical chamber and having the end formed to provide a valve seat circumambient an inlet port, a valve operating spindle reciprocable in the cage and having one end extending beyond the confines of the cage and a valve adjustably carried on the end of the spindle adapted to be seated on said seat, a spring interposed between the valve and the bottom of the housing for closing the valve, a reciprocable cam member in the cage carried by the spindle and having a pair of helical cam faces, a second rotatable cam provided with a pair of cam faces matched to and adapted to cooperate with the faces of the first cam to reciprocate the first cam upon rotation of the second cam, an operating shaft for supporting the second cam and a bonnet for attachment to the housing and supporting the operating stem, a packing gland in the bonnet providing a rotational seal for the operating stem and an operating handle for rotating the stem telescoped over the end of the stem and provided with a skirt adapted to tighten the packing gland by longitudinal adjustment of the handle on said stem.

4. In a faucet including a housing, a coupling on the housing for engagement with a fluid line to provide an inlet, a spout on the housing providing a fluid outlet, a cylindrical chamber in the housing, an apertured diaphragm bridging the housing between the inlet and the outlet at the end of said chamber, a valve mechanism including a cage disposed in said cylindrical chamber and seated on the diaphragm, the end of said cage extending through the aperture in the diaphragm and having the end formed to provide a valve seat circumambient an inlet port, a partition bridging the intermediate portion of the valve cage, a valve operating spindle, said partition adapted to form a guide for the spindle, said spindle being reciprocable in the cage and having one end extending beyond the confines of the cage, a valve adjustably carried on the end of the spindle and adapted to be seated on said seat, a spring interposed between the valve and the bottom of the housing for closing the valve, a cam member carried by the spindle above said partition in the cage and having a pair of helical cam faces, said cam being guided by the upper end of the valve cage so as to permit reciprocable movement only, a second cam provided with a pair of helical cam faces matched to the faces of the first cam, an operating shaft for supporting and rotating the second cam, a bonnet for attachment to the housing, said operating shaft extending through and carried thereby so as to permit rotational movement only of the operating cam, a packing gland in the bonnet providing a rotational seal for the operating stem, a handle telescoped over the end of the stem and having a skirt adapted to engage and tighten the packing gland by longitudinal adjustment of the handle on said stem.

GUSTAVE MUELLER.